United States Patent
Thakkar et al.

(10) Patent No.: US 10,282,222 B2
(45) Date of Patent: May 7, 2019

(54) CLOUD VIRTUAL MACHINE DEFRAGMENTATION FOR HYBRID CLOUD INFRASTRUCTURE

(71) Applicant: VMware, Inc., Palo Alto, CA (US)

(72) Inventors: Sachin Thakkar, San Jose, CA (US);
Debashis Basak, San Jose, CA (US);
Serge Maskalik, Los Gatos, CA (US);
Weiqing Wu, Cupertino, CA (US);
Abhinav Vijay Bhagwat, Pune (IN)

(73) Assignee: VMWARE, INC., Palo Alto, CA (US)

( * ) Notice: Subject to any disclaimer, the term of this patent is extended or adjusted under 35 U.S.C. 154(b) by 139 days.

(21) Appl. No.: 14/528,725

(22) Filed: Oct. 30, 2014

(65) Prior Publication Data
US 2016/0103699 A1  Apr. 14, 2016

Related U.S. Application Data

(60) Provisional application No. 62/063,276, filed on Oct. 13, 2014.

(51) Int. Cl.
G06F 9/455    (2018.01)
G06F 9/50     (2006.01)

(52) U.S. Cl.
CPC ........ *G06F 9/45558* (2013.01); *G06F 9/5083* (2013.01); *G06F 2009/4557* (2013.01)

(58) Field of Classification Search
None
See application file for complete search history.

(56) References Cited

U.S. PATENT DOCUMENTS

| | | | | |
|---|---|---|---|---|
| 8,862,744 B2* | 10/2014 | Garg | | 370/236 |
| 2012/0102190 A1* | 4/2012 | Durham | | H04L 41/0823 |
| | | | | 709/224 |
| 2013/0152076 A1* | 6/2013 | Patel | | G06F 9/45558 |
| | | | | 718/1 |
| 2013/0304899 A1* | 11/2013 | Winkler | | H04L 67/34 |
| | | | | 709/224 |
| 2015/0135178 A1* | 5/2015 | Fischer | | H04L 67/10 |
| | | | | 718/1 |

OTHER PUBLICATIONS

Jason Sonnek, "Starling: Minimizing Communication Overhead in Virtualized Computing Platforms Using Decentralized Affinity-Aware Migration", 2010, University of Minnesota Minneapolis, MN 55455.*

* cited by examiner

*Primary Examiner* — Wynuel S Aquino
(74) *Attorney, Agent, or Firm* — Loza & Loza, LLP

(57) ABSTRACT

A hybrid cloud computing system is managed by determining communication affinity between a cluster of virtual machines, where one virtual machine in the cluster executes in a virtualized computing system, and another virtual machine in the cluster executes in a cloud computing environment, and where the virtualized computing system is managed by a tenant that accesses the cloud computing environment. After determining a target location in the hybrid cloud computing system to host the cluster of virtual machines based on the determined communication affinity, at least one of the cluster of virtual machines is migrated to the target location.

17 Claims, 4 Drawing Sheets

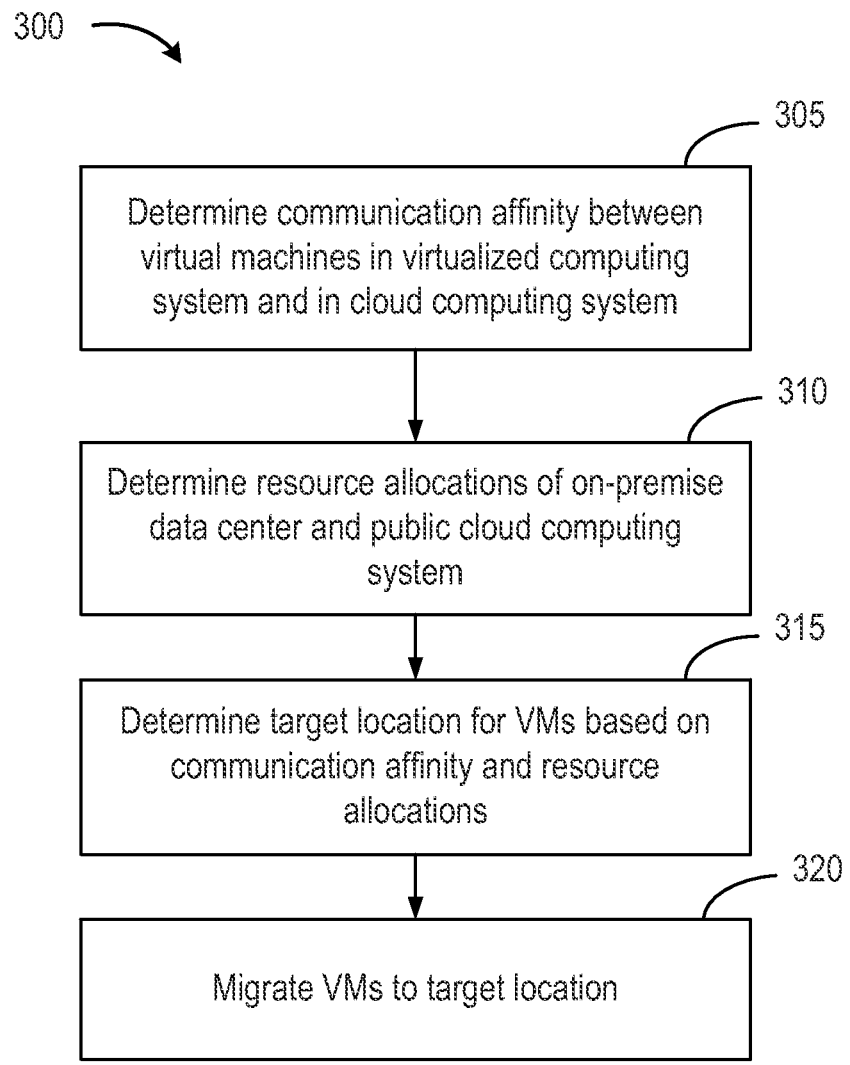

CLOUD VIRTUAL MACHINE DEFRAGMENTATION FOR HYBRID CLOUD INFRASTRUCTURE

CROSS-REFERENCE TO RELATED APPLICATION(S)

This application claims the benefit of U.S. Provisional Patent Application No. 62/063,276, filed Oct. 13, 2014, the entire contents of which are incorporated by reference herein.

BACKGROUND

Cloud architectures are used in cloud computing and cloud storage systems for offering infrastructure-as-a-service (IaaS) cloud services. Examples of cloud architectures include the VMware vCloud™ Director cloud architecture software, Amazon EC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs such as virtual machines (VMs) and logical networks. However, the use of such public cloud services is typically kept separate from the use of existing computing resources in data centers managed by an enterprise.

Hybrid cloud infrastructures combine public cloud services with privately maintained computing infrastructures, where the combined infrastructure is accessible to end users according to a standard interface. That is, the end user need not know what resources are maintained or stored in the private infrastructure and what resources are maintained or stored in the public cloud.

Hybrid cloud infrastructures are used to deploy multi-tiered applications to end users. Multi-tiered applications often comprise a plurality of components (for example, VMs), each of which performs one or more discrete functions for the overall application. When application components are deployed to a hybrid cloud, some (or all) components communicate regularly and frequently with one another. Thus, it is advantageous to deploy these components on a single host, or on a single cluster or set of co-located hosts, whether that host is on the privately maintained infrastructure or in the public cloud. However, for a variety of reasons, a system administrator may deploy such components (which are referred to as being in heavy communication with one another) to different host systems in the hybrid cloud computing system. For example, communication patterns between components may not be predictable prior to deploying the components. Further, it may be the case that the components are deployed to different hosts (or to different cloud infrastructures) as a result of administrator error. Finally, some multi-tiered applications perform "auto-scaling" when the application is utilized beyond some threshold of activity. When an application is auto-scaled, virtual machines are automatically created to handle increased system load. However, typical auto-scaling solutions are usually unconcerned with keeping application components that frequently communicate with one another together on a common host. As a result, application components that frequently communicate with one another may be deployed to hosts that are remote from each other. Thus, the application components are required to communicate over a network link between hosts. Since network links introduce latency due to network utilization and distance between end points, and unreliability due to network outages, such a deployment of frequently communicating application components results in certain inefficiencies that would have been avoided had the components been deployed to the same host.

SUMMARY

A method for managing a hybrid cloud computing system having a virtualized computing system that includes a plurality of hosts and a cloud computing environment is provided. The method includes determining communication affinity between a cluster of virtual machines including a first virtual machine and a second virtual machine. The first virtual machine is executing in a virtualized computing system, and the second virtual machine is executing in a cloud computing environment. The virtualized computing system is managed by a tenant that accesses the cloud computing environment. The method further includes determining a target location in the hybrid cloud computing system to host the cluster of virtual machines based on the communication affinity, and migrating at least one of the cluster of virtual machines to the target location.

Further embodiments provide a non-transitory computer-readable medium that includes instructions that, when executed, enable one or more computer hosts to implement one or more aspects of the above method, and a cloud-based computing system that includes one or more computer hosts programmed to implement one or more aspects of the above method.

BRIEF DESCRIPTION OF THE DRAWINGS

FIG. 3 is a flow diagram that depicts a method for migrating VMs among host computers and a cloud computing environment included in a hybrid cloud computing system, according to one or more embodiments.

DETAILED DESCRIPTION

Figure 1:
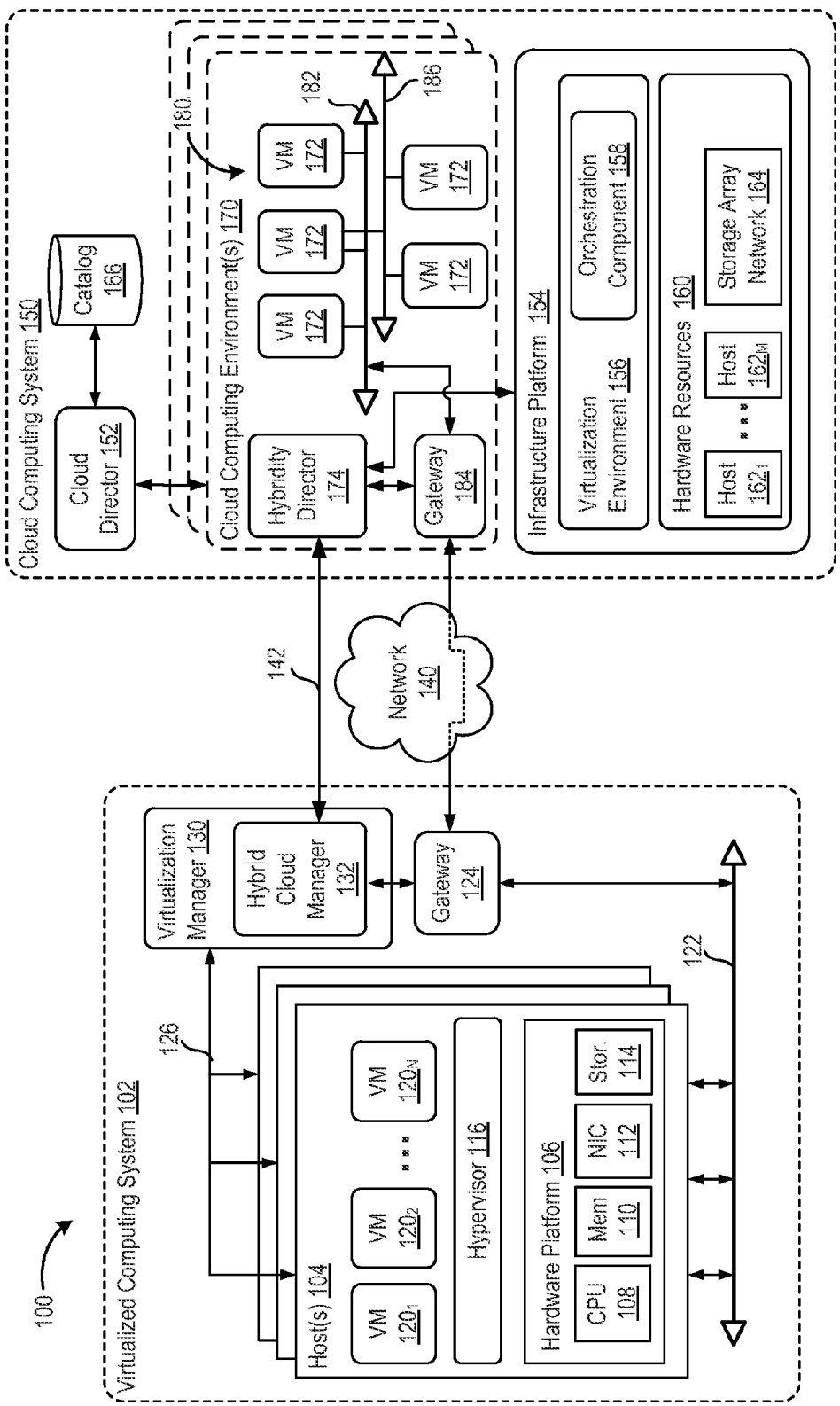
FIG. 1 is a block diagram of a hybrid cloud computing system in which one or more embodiments of the present disclosure may be implemented.

FIG. 1 is a block diagram of a hybrid cloud computing system 100 in which one or more embodiments of the present disclosure may be utilized. Hybrid cloud computing system 100 includes a virtualized computing system 102 and a cloud computing system 150, and is configured to provide a common platform for managing and executing virtual workloads seamlessly between virtualized computing system 102 and cloud computing system 150. In one embodiment, virtualized computing system 102 may be a data center controlled and administrated by a particular enterprise or business organization, while cloud computing system 150 is operated by a cloud computing service provider and exposed as a service available to account holders, such as the particular enterprise in addition to other enterprises. As such, virtualized computing system 102 may sometimes be referred to as an on-premise data center(s), and cloud computing system 150 may be referred to as a "public" cloud service. In some embodiments, virtualized computing system 102 itself may be configured as a private cloud service provided by the enterprise.

As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In embodiments disclosed herein, a hybrid cloud is a cloud architecture in which a tenant is provided with seamless access to both private cloud resources and public cloud resources.

Virtualized computing system 102 includes one or more host computer systems 104. Hosts 104 may be constructed on a server grade hardware platform 106, such as an x86 architecture platform, a desktop, and a laptop. As shown, hardware platform 106 of each host 104 may include conventional components of a computing device, such as one or more processors (CPUs) 108, system memory 110, a network interface 112, storage 114, and other I/O devices such as, for example, a mouse and keyboard (not shown). Processor 108 is configured to execute instructions, for example, executable instructions that perform one or more operations described herein and may be stored in system memory 110 and in local storage. System memory 110 is a device allowing information, such as executable instructions, cryptographic keys, virtual disks, configurations, and other data, to be stored and retrieved. System memory 110 may include, for example, one or more random access memory (RAM) modules. Network interface 112 enables host 104 to communicate with another device via a communication medium, such as a network 122 within virtualized computing system 102. Network interface 112 may be one or more network adapters, also referred to as a Network Interface Card (NIC). Storage 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtual machines $120_1$ to $120_N$ (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware ESXi hypervisor provided as part of the VMware vSphere solution made commercially available from VMware, Inc. Hypervisor 116 may run on top of the operating system of host 104 or directly on hardware components of host 104.

Virtualized computing system 102 includes a virtualization management module (depicted in FIG. 1 as virtualization manager 130) that may communicate to the plurality of hosts 104 via a network, sometimes referred to as a management network 126. In one embodiment, virtualization manager 130 is a computer program that resides and executes in a central server, which may reside in virtualized computing system 102, or alternatively, running as a VM in one of hosts 104. One example of a virtualization management module is the vCenter® Server product made available from VMware, Inc. Virtualization manager 130 is configured to carry out administrative tasks for virtualized computing system 102, including managing hosts 104, managing VMs 120 running within each host 104, provisioning VMs, migrating VMs from one host to another host, and load balancing between hosts 104.

In one embodiment, virtualization manager 130 includes a hybrid cloud management module (depicted as hybrid cloud manager 132) configured to manage and integrate virtualized computing resources provided by cloud computing system 150 with virtualized computing resources of virtualized computing system 102 to form a unified "hybrid" computing platform. Hybrid cloud manager 132 is configured to deploy VMs in cloud computing system 150, transfer VMs from virtualized computing system 102 to cloud computing system 150, and perform other "cross-cloud" administrative task, as described in greater detail later. In one implementation, hybrid cloud manager 132 is a module or plug-in complement to virtualization manager 130, although other implementations may be used, such as a separate computer program executing in a central server or running in a VM in one of hosts 104.

In one embodiment, hybrid cloud manager 132 is configured to control network traffic into network 122 via a gateway component (depicted as a gateway 124). Gateway 124 (e.g., executing as a virtual appliance) is configured to provide VMs 120 and other components in virtualized computing system 102 with connectivity to an external network 140 (e.g., Internet). Gateway 124 may manage external public IP addresses for VMs 120 and route traffic incoming to and outgoing from virtualized computing system 102 and provide networking services, such as firewalls, network address translation (NAT), dynamic host configuration protocol (DHCP), load balancing, and virtual private network (VPN) connectivity over a network 140. In some embodiments, gateway 124 may be configured to detect bandwidth utilization on specific network interfaces and provide a tenant-based metering ability.

In one or more embodiments, cloud computing system 150 is configured to dynamically provide an enterprise (or users of an enterprise) with one or more virtual data centers 180 in which a user may provision VMs 120, deploy multi-tier applications on VMs 120, and/or execute workloads. Cloud computing system 150 includes an infrastructure platform 154 upon which a cloud computing environment 170 may be executed. In the particular embodiment of FIG. 1, infrastructure platform 154 includes hardware resources 160 having computing resources (e.g., hosts $162_1$ to $162_M$), storage resources (e.g., one or more storage array systems, such as SAN 164), and networking resources, which are configured in a manner to provide a virtualization environment 156 that supports the execution of a plurality of virtual machines 172 across hosts 162. It is recognized that hardware resources 160 of cloud computing system 150 may in fact be distributed across multiple data centers in different locations.

Each cloud computing environment 170 is associated with a particular tenant of cloud computing system 150, such as the enterprise providing virtualized computing system 102. In one embodiment, cloud computing environment 170 may be configured as a dedicated cloud service for a single tenant comprised of dedicated hardware resources 160 (i.e., physically isolated from hardware resources used by other users of cloud computing system 150). In other embodiments, cloud computing environment 170 may be configured as part of a multi-tenant cloud service with logically isolated virtualized computing resources on a shared physical infrastructure. As shown in FIG. 1, cloud computing system 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if enterprise required a specified number of virtual machines to deploy a web applications or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, similar to virtualized computing system 102, virtualization environment 156 may be implemented by running on hosts 162 VMware ESX™-based hypervisor technologies provided by VMware, Inc. of Palo Alto, Calif. (although it should be recognized that any other virtualization technologies, including Xen® and Microsoft Hyper-V virtualization technologies may be utilized consistent with the teachings herein).

In one embodiment, cloud computing system 150 may include a cloud director 152 (e.g., run in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and virtual machine packages that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A virtual machine package is a logical container of one or more pre-configured virtual machines that package applications and parameters that define operational details of the package. An example of a VM package is vApp™ technology made available by VMware, Inc., of Palo Alto, Calif., although other technologies may be utilized. Cloud director 152 receives provisioning requests submitted (e.g., via REST API calls) and may propagates such requests to orchestration component 158 to instantiate the requested virtual machines (e.g., VMs 172).

In the embodiment of FIG. 1, cloud computing environment 170 supports the creation of a virtual data center 180 having a plurality of virtual machines 172 instantiated to, for example, host deployed multi-tier applications. A virtual data center 180 is a logical construct that provides compute, network, and storage resources to an organization. Virtual data centers 180 provide an environment where VM 172 can be created, stored, and operated, enabling complete abstraction between the consumption of infrastructure service and underlying resources. VMs 172 may be configured similarly to VMs 120, as abstractions of processor, memory, storage, and networking resources of hardware resources 160.

Virtual data center 180 includes one or more virtual networks 182 used to communicate between VMs 172 and managed by at least one networking gateway component (e.g., gateway 184), as well as one or more isolated internal networks 186 not connected to gateway 184. Gateway 184 (e.g., executing as a virtual appliance) is configured to provide VMs 172 and other components in cloud computing environment 170 with connectivity to external network 140 (e.g., Internet). Gateway 184 manages external public IP addresses for virtual data center 180 and one or more private internal networks interconnecting VMs 172. Gateway 184 is configured to route traffic incoming to and outgoing from virtual data center 180 and provide networking services, such as firewalls, network address translation (NAT), dynamic host configuration protocol (DHCP), and load balancing. Gateway 184 may be configured to provide virtual private network (VPN) connectivity over a network 140 with another VPN endpoint, such as a gateway 124 within virtualized computing system 102. In other embodiments, gateway 184 may be configured to connect to communicate with virtualized computing system 102 using a high-throughput, dedicated link (depicted as a direct connect 142) between virtualized computing system 102 and cloud computing system 150. In one or more embodiments, gateways 124 and 184 are configured to provide a "stretched" layer-2 (L2) network that spans virtualized computing system 102 and virtual data center 180, as shown in FIG. 1.

While FIG. 1 depicts a single connection between on-premise gateway 124 and cloud-side gateway 184 for illustration purposes, it should be recognized that multiple connections between multiple on-premise gateways 124 and cloud-side gateways 184 may be used. Furthermore, while FIG. 1 depicts a single instance of a gateway 184, it is recognized that gateway 184 may represent multiple gateway components within cloud computing system 150. In some embodiments, a separate gateway 184 may be deployed for each virtual data center, or alternatively, for each tenant. In some embodiments, a gateway instance may be deployed that manages traffic with a specific tenant, while a separate gateway instance manages public-facing traffic to the Internet. In yet other embodiments, one or more gateway instances that are shared among all the tenants of cloud computing system 150 may be used to manage all public-facing traffic incoming and outgoing from cloud computing system 150.

In one embodiment, each virtual data center 180 includes a "hybridity" director module (depicted as hybridity director 174) configured to communicate with the corresponding hybrid cloud manager 132 in virtualized computing system 102 to enable a common virtualized computing platform between virtualized computing system 102 and cloud computing system 150. Hybridity directory 174 (e.g., executing as a virtual appliance) may communicate with hybrid cloud manager 132 using Internet-based traffic via a VPN tunnel established between gateways 124 and 184, or alternatively, using direct connect 142. In one embodiment, hybridity director 174 may control gateway 184 to control network traffic into virtual data center 180. In some embodiments, hybridity director 174 may control VMs 172 and hosts 162 of cloud computing system 150 via infrastructure platform 154.

Figure 2A:
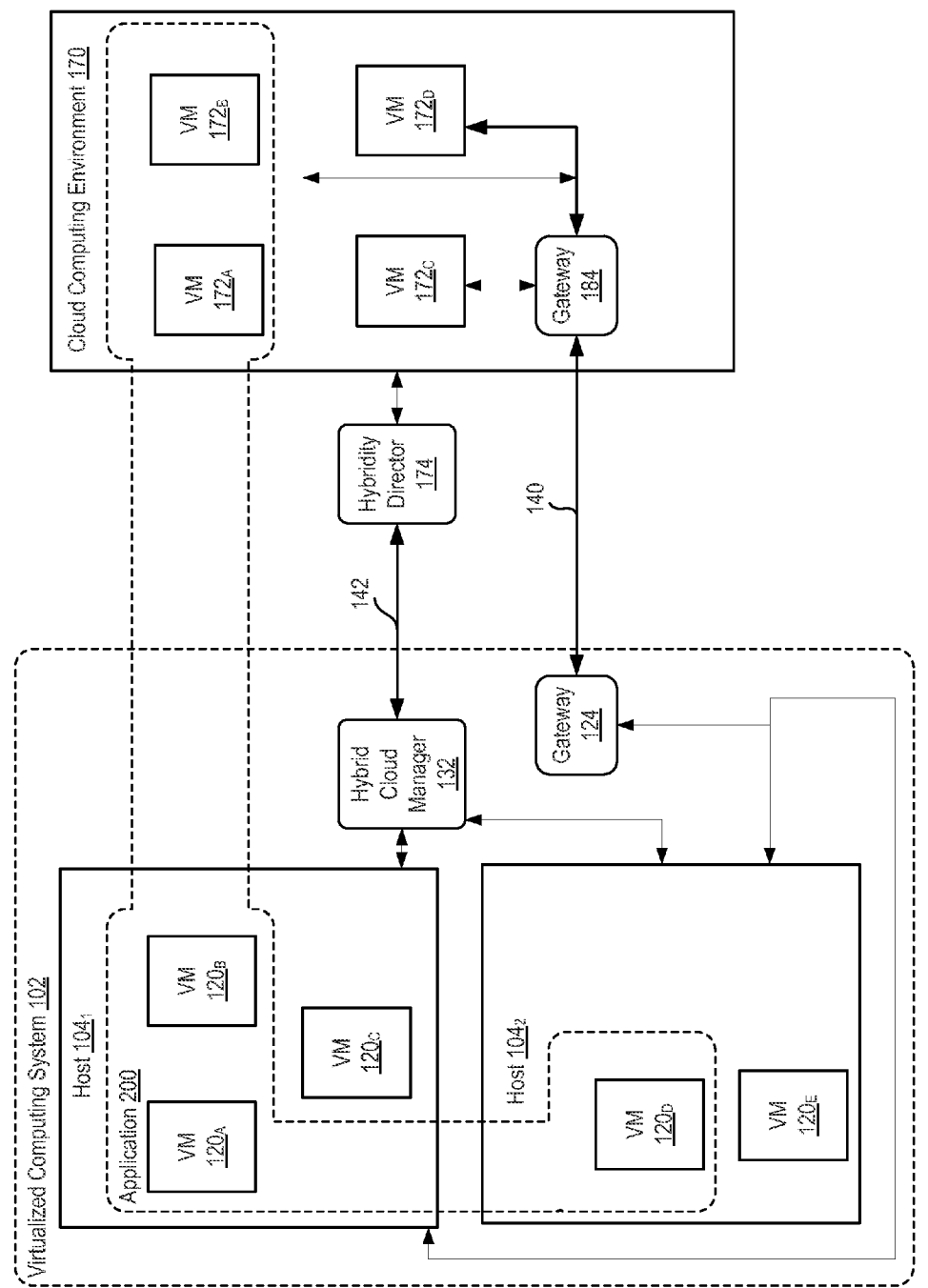
FIGS. 2A and 2B are conceptual diagrams depicting the migration of virtual machines among hosts and a cloud computing environment included in a hybrid cloud computing system, according to one or more embodiments.
Figure 2B:
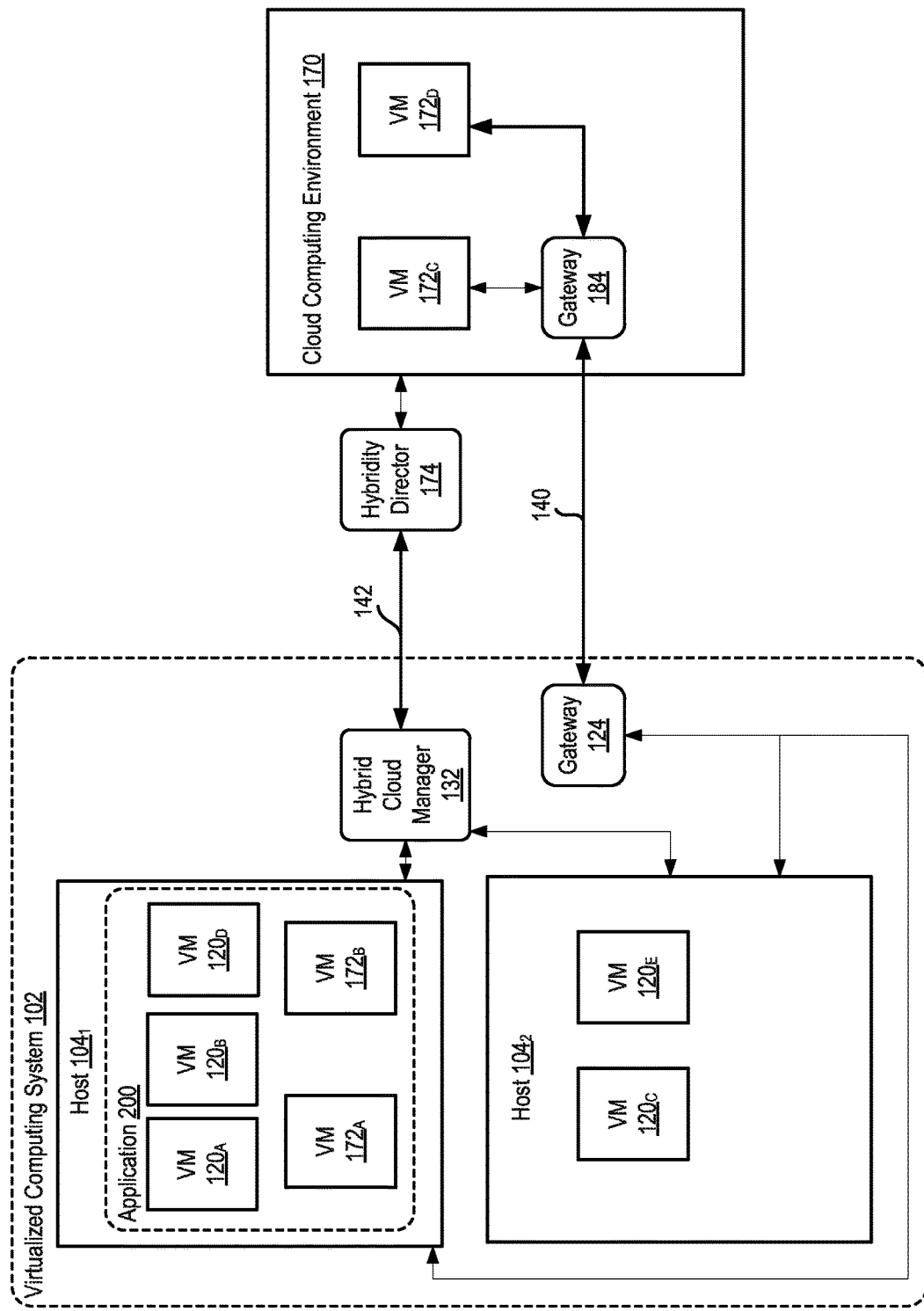

FIGS. 2A and 2B are conceptual diagrams depicting the migration of virtual machines between hosts 104 and cloud computing environment 170 in hybrid cloud computing system 100, according to one or more embodiments. FIG. 2A depicts VMs 120 and VMs 172 that have been deployed on two hosts $104_1$ and $104_2$ and in cloud computing environment 170 prior to migration of any of the VMs. FIG. 2B depicts the same set of VMs 120 and VMs 172 depicted in FIG. 2A after one or more of the VMs have been migrated.

Each of hosts $104_1$ and $104_2$ in FIG. 2A executes within virtualized computing system 102. In some embodiments, hosts $104_1$ and $104_2$ may be physically located in the same data center. That is, each of hosts $104_1$ and $104_2$ may be rack-mounted servers located in the same physical room, and connected over a local area network (LAN). In other embodiments, hosts $104_1$ and $104_2$ may be included in the same enterprise-wide data center, but located at different physical locations. In such embodiments, hosts $104_1$ and $104_2$ communicate over an enterprise physical or virtual private network. As shown in the figure, prior to the migration of any VMs, host $104_1$ has executing therein three VMs, namely, VM $120_A$, VM $120_B$, and VM $120_C$, and host $104_2$ has executing therein two virtual machines, VMs $120_D$ and $120_E$. Cloud computing environment 170 has four virtual machines deployed therein: VM $172_A$, VM $172_B$, VM $172_C$, and VM $172_D$.

In one embodiment, hybrid cloud computing system 100 may support execution of a hybrid cloud application 200 using virtualized computing resources (e.g., VMs) distributed across virtualized computing system 102 and cloud computing environment 170. Application 200 may be, in embodiments, a multi-tiered application, where each tier is implemented by one or more virtual machines. For example, application 200 may be a multi-tiered travel reservation system consisting of three tiers: a presentation tier, implemented as a web interface, an application tier (which implements the transaction processing logic for the system), and a database tier, which persistently stores data related to the reservation system. In the example shown, tiers of application 200 may be distributed across VMs $120_A$ and $120_B$ (in host $104_1$), VM $120_D$ (in host $104_2$), and VMs $172_A$ and $172_B$ (in cloud computing environment 170).

In this example, VMs $120_A$ and $120_B$ executed in tandem with one another to implement the middle application tier. In this case, in order to process heavy and unpredictable workloads, it is advantageous to have two VMs in the application tier. As a result of being in the same application tier, VMs $120_A$ and $120_B$, in this and other embodiments, communicate frequently with one another. For example, VM $120_A$ may be programmed to inform VM $120_B$ when VM $120_A$ is processing a certain predetermined volume of transactions. In response, VM $120_B$ may be programmed to process new transactions in order to prevent VM $120_A$ from becoming overwhelmed. In like manner, when VM $120_B$ processes a predetermined volume of transactions, VM $120_B$ informs VM $120_A$ of this and, in response, VM $120_A$ then processes new transactions to alleviate the workload of VM $120_B$.

In the example depicted, VM $120_D$ executing on host $104_2$ may implement the database tier of application 200. As such, it may be the case that VMs $120_A$ and $120_B$ (i.e., the application tier of application 200) need to also communicate frequently with VM $120_D$. For example, in order to process an airline reservation transaction, VM $120_A$ or $120_B$ requires airline scheduling information that is typically stored in a central data repository, which, in this example, is implemented by VM $120_C$. Thus, in order for VM $120_A$ or $120_B$ to obtain this information, each of the VMs communicates with host $104_2$ over either a LAN or enterprise network link. Due to potential latency that may exist on the LAN or enterprise network, such communication is often slower than communication between virtual machines deployed on the same host (such as VMs $120_A$ and $120_B$) or on the same set of co-located hosts (such as VMs $120_A$ and $120_D$, or VMs $172_A$ and $172_B$).

In the embodiment of FIG. 2A, VMs $172_A$ and $172_B$ (of cloud computing environment 170) may implement the presentation tier of application 200. That is, VMs $172_A$ and $172_B$ are virtualized web servers, which serve web pages to clients in order to enable those clients to interact with application 200. VMs $172_A$ and $172_B$ (as presentation tier virtual machines) communicate frequently with the application tier of application 200 (i.e., with VMs $120_A$ and $120_B$). This communication takes place over direct connect 142 or network 140. VMs $172_A$ and $172_B$ are VMs that are deployed for a single tenant in cloud computing environment 170, that tenant being the owner of application 200.

As shown in the figure, virtualized computing system 102 and cloud computing environment 170 may also include virtualized computing resources (e.g., VMs) that are not components of application 200. For example, host $104_1$ includes a third VM $120_C$, which is not associated with either VM $120_A$ or VM $120_B$. Rather, VM $120_C$ separately executes applications for the enterprise that uses virtualized computing system 102. Thus, while VMs $120_A$ and $120_B$ communicate frequently with one another, VM $120_C$ communicates infrequently (or not at all) with either VM $120_A$ or $120_B$. Similarly, host $104_2$ includes VM $120_E$, which is also not a component of application 200. Therefore, VM $120_E$ communicates little (or not at all) with VMs $120_A$, $120_B$, and $120_D$. In one or more embodiments, VM $120_E$ is a standalone virtual machine that carries out tasks independent of any other virtual machine deployed in virtualized computing system 102. VMs $172_C$ and $172_D$ of cloud computing environment 170 correspond to other workloads deployed in cloud computing environment 170 by the tenant. These VMs execute independently of VMs $172_A$ and $172_B$ and may have little interaction with those VMs.

As mentioned earlier, hybrid cloud manager 132 may, in some embodiments, transmit a request to hybridity director 174 to transfer one or more VMs deployed in virtualized computing system 102 to cloud computing environment 170. In other cases, hybrid cloud manager 132 may instruct hybridity director 174 to power off one or more VMs deployed in cloud computing environment 170. In one scenario, the presentation tier for application 200 may have originated in virtualized computing system 102, and during operation, may have been transferred cross-cloud (to cloud computing environment 170) and scaled up in response to a sudden surge in traffic or workload. In this scenario, the surge in traffic or workload eventually subsides, and the presentation tier is scaled down, eventually, to just being implemented by VMs $172_A$ and $172_B$. As shown, the combination of dynamic scaling for a workload and cross-cloud operations can often result in a "fragmented" deployment of application 200, that is, a deployment of an application which is inefficiently distributed between virtualized computing system 102 and cloud computing environment 170. Accordingly, embodiments of the present disclosure provide a mechanism to "de-fragment" groups of virtualized computing resources in a hybrid cloud architecture.

Among the functions that hybrid cloud manager 132 performs is the monitoring of network traffic between VMs deployed on hosts 104 within virtualized computing system 102. Specifically, hybrid cloud manager 132 detects pairs or groups of virtual machines that communicate frequently with one another and/or exclusively with one another. In one embodiment, hybrid cloud manager 132 may perform this function by communicating with gateway 124. According to one or more embodiments, hybrid cloud manager 132 monitors data packets transmitted through gateway 124 and inspects header information for those packets. The header information includes the address of the VM that sent the data packet and the address of the VM that is targeted to receive the data packet. Further, hybridity director 174 may be configured to monitor gateway 184 in the same way. Hybrid cloud manager 132 and hybridity director 174, by monitoring the data packets transmitted through gateways 124 and 184, detect communication patterns between the virtual machines. Hybridity director 174 transmits to hybrid cloud manager 132 the patterns detected with respect to the VMs deployed in the cloud.

Hybrid cloud manager 132 is configured to determine communication patterns between the VMs, including communication between VMs deployed in virtualized computing system, communication between VMs deployed in cloud computing environment 170, and communication between a VM deployed in virtualized computing system 102 and cloud computing environment 170. In this way, hybrid cloud manager 132 determines which VMs (whether deployed in cloud computing environment 170 or in virtualized computing system 102) communicate frequently and/or nearly exclusively with one another. For example, in the embodiment depicted in FIG. 2A, hybrid cloud manager 132 may determine that VMs $120_A$, $120_B$, and $120_D$ communicate frequently with one another. Further, because these VMs implement different tiers in the same application (i.e., application 200), the VMs also communicate almost exclusively with one another. That is, VMs $120_A$, $120_B$, and $120_D$ might rarely communicate with VMs that are not a part of application 200 (such as VMs $120_C$ and $120_E$).

Further, hybrid cloud manager 132 also determines, by monitoring gateway 124, that VMs $172_A$ and $172_B$ also communicate frequently and almost exclusively with either VMs $120_A$ or $120_B$. This is due to the fact that web requests transmitted by clients of VMs $172_A$ and $172_B$ (which are, typically, Hypertext Transfer Protocol (or HTTP) requests) are received and interpreted by VMs $172_A$ and $172_B$, which, subsequently, transmit application requests to VMs $120_A$ and $120_B$. For instance, a client receives a web page from VM $172_A$, which renders a data input form in a client web browser. The client then submits the form after entering input, which transmits the data to VM $172_A$. VM $172_A$ then interprets the received data and, if appropriate, makes an application request to either VM $120_A$ or VM $120_B$. Thus, in this case, hybrid cloud manager 132 detects network traffic (i.e., data packets) being sent between VM $172_A$ and either VM $120_A$ or VM $120_B$. Hybrid cloud manager 132 (by monitoring gateway 124) examines the headers of the data packets and determines that the packets correspond to communication between VM $172_A$ and either of VMs $120_A$ or VM $120_B$. Then, hybrid cloud manager 132 determines that the volume of data packets transmitted between these VMs exceeds a certain threshold level and, as a result, that a high degree of communication takes place between VMs $172_A$ and VM $120_A$ or $120_B$.

Hybrid cloud manager 132 is configured to migrate VMs exhibiting a high degree of communication to a common location. For example, when hybrid cloud manager 132 determines that there is a high degree of communication between VMs deployed in hybrid cloud computing system 100, hybrid cloud manager 132 may determine whether or not those VMs exhibiting a high degree of communication are in fact deployed in the same data center, such as on the same physical host 104 or on hosts 104 in the same virtualized computing system 102, or, in cloud computing environment 170. If such VMs are not all deployed on the same physical host 104 or in cloud computing environment 170, one or more embodiments of hybrid cloud manager 132 attempt to migrate one or more VMs in order to place all VMs in a common location, either on in virtualized computing system 102 or in cloud computing environment 170. In doing so, hybrid cloud manager 132 re-organizes the placement of VMs between virtualized computing system 102 and cloud computing environment 170 to reduce "inter-cloud" communication between a first VM in virtualized computing system 102 and a second VM in cloud computing environment 170. It is understood that such inter-cloud communication between VMs that communicate heavily and exclusively with one another may suffer network latency or the unavailability of network components when such communication is over a remote or long-distance link, such as direct connect 142 or network 140, which connect virtualized computing system 102 with cloud computing environment 170.

FIG. 3 depicts a method 300 for migrating VMs among host computers and a public cloud in a hybrid cloud computing environment, according to one or more embodiments. In embodiments, method 300 is carried out by a cloud management module, such as hybrid cloud manager 132. In addition, a hybridity director (such as hybridity director 174) may carry out portions of method 300 in order to enable a common virtualized computing system that includes a public cloud component.

Method 300 begins at step 305, where hybrid cloud manager 132 determines communication affinity between a plurality of VMs in virtualized computing system 102 and in cloud computing environment 170. In one embodiment, hybrid cloud manager 132 may utilize a clustering algorithm to map out the plurality of VMs 120 and VMs 172 into one or more clusters (i.e., a conceptual grouping of VMs) based on communication trends detected between the VMs. In one or more embodiments, hybrid cloud manager 132 analyzes network traffic transmitted through a gateway (such as gateway 124) interconnecting virtualized computing system 102 and cloud computing environment 170. Hybrid cloud manager 132 examines the headers of data packets transmitted through gateway 124 to determine whether a particular VM transmits packets frequently (and exclusively) to one or more VMs in the cluster, in virtualized computing system 102 and in cloud computing environment 170. A measure of frequency and exclusivity of communication between VMs may be taken over a predetermined time interval. For example, hybrid cloud manager 132 analyzes packets for a given VM over a given time interval (e.g., one hour) to determine that the VM communicates exclusively with one or more VMs in the cluster during that time interval. According to embodiments, hybrid cloud manager 132 calculates the total number of packets that are transmitted to and from a given VM. Then, hybrid cloud manager 132 determines the number of those packets that are communicated to and from one or more VMs in the cluster. If the ratio of the number of packets a given VM communicates to and receives from another VM or other VMs in the forming cluster to the total number of packets communicated to and from the given VM during the predetermined time interval exceeds a predetermined threshold value (e.g., 90% of the data packets transmitted and received), then hybrid cloud manager 132 determines that the given VM communicates frequently and exclusively with other VMs that are in the cluster. In an alternative embodiment, gateway 124 may examine the headers of data packets between VMs on the on-premise data center and VMs of cloud computing environment 170 and compile statistics related to communication affinity. In such an embodiment, hybrid cloud manager 132 retrieves the generated statistics from gateway 124.

At step 310, hybrid cloud manager 132 determines resource allocations of the on-premise data center and the public cloud computing system. In one embodiment, hybrid cloud manager 132 monitors resource utilization of various hosts 104 that are included in virtualized computing system 102. If a particular host 104 does not have the necessary resources to execute all of the VMs that are determined to be in heavy communication with one another, then hybrid cloud manager 132 might not consider that host as a target for migration. Among the system resources that hybrid cloud manager 132 monitors are CPU utilization, RAM utilization, the level of network traffic processed by the NICs on the host, and the like. In some embodiments, if hybrid cloud manager 132 determines that there are enough system resources on one or more hosts 104 on the on-premise side, then hybrid cloud manager 132 might select virtualized computing system 102 as the target for migration of one or more VMs, such that, after migration, all VMs that hybrid cloud manager 132 determines are in heavy communication with one another are consolidated on a host included in virtualized computing system 102.

Hybrid cloud manager 132 may also instruct hybridity director 174 to make similar determinations regarding system resource availability of cloud computing environment 170. In response to the instruction received from hybrid cloud manager 132, hybridity director 174 monitors CPU utilization, RAM utilization, storage utilization, and the like to determine whether or not the full set of VMs that are determined to be in heavy communication with one another can be migrated to cloud computing environment 170. After having made this determination, hybridity director 174 transmits the results of the determination to hybrid cloud manager 132. Thus, having this information, hybrid cloud manager 132 can make a determination to migrate VMs to cloud computing environment 170. This is especially useful when none of the hosts 104 that are included in virtualized computing system 102 has the capacity to host all of the VMs that are determined to be in heavy communication with one another.

At step 315, hybrid cloud manager 132 determines a target location for the plurality of VMs based on the determined communication affinity and on the determined resource allocation of virtualized computing system 102 and cloud computing system 150. In one embodiment, responsive to determining that VMs having a high communication affinity are split between virtualized computing system 102 and cloud computing environment 170, hybrid cloud manager 132 may select a target location from at least one of one or more hosts on virtualized computing system 102 and cloud computing environment 170.

In one embodiment, hybrid cloud manager 132 determines whether the target location has sufficient resources required to host all VMs in the cluster. For example, hybrid cloud manager 132 analyzes, among other things, the CPU utilization, the memory utilization, and the level of network traffic at the target location. If the target location does have sufficient resources to support the execution of all of the VMs in the cluster, then, at step 320, hybrid cloud manager 132 migrates all VMs in the cluster to the target location. In some cases, hybrid cloud manager 132 might select a host on virtualized computing system 102 as the target location for the plurality of VMs having high communication affinity based on the available resource allocation (of virtualized computing system 102). In other cases, hybrid cloud manager 132 might select a virtual data center 180 in cloud computing environment 170 as the target location for the plurality of VMs having high communication affinity based on the available resource allocation in cloud computing environment 170 (and unavailable resources in virtualized computing system 102).

In some embodiments, when hybrid cloud manager 132 determines that a target location (e.g., host 104) does not have sufficient capacity to host all VMs determined to be in heavy communication with one another, hybrid cloud manager 132 may initiate a migration of other VMs that are deployed on the potential target host and that are not a part of the group of VMs that are in heavy communication with one another. This has the effect of "freeing" capacity on the potential target host 104 because the migrated VMs no longer utilize resources on that host. Therefore, after additional system capacity becomes available, hybrid cloud manager 132 proceeds, to step 320, to migrate VMs to the target location.

For instance, referring back to FIG. 2A, hybrid cloud manager 132 determines that each of VMs $120_A$, $120_B$, $120_D$, $172_A$, and $172_B$ should be deployed on a single host 104 in virtualized computing system 102. Hybrid cloud manager 132 determines host $104_1$ as the target host for deployment of the VMs. However, hybrid cloud manager 132 also determines that host $104_1$ does not have sufficient system resources to host each of the VMs that are in heavy communication with one another, as well as the other VM that is already deployed to host $104_1$ (i.e., VM $120_C$). Thus, prior to migrating VMs $120_D$, $172_A$, and $172_D$ to host $104_1$, hybrid cloud manager 132 determines that VM $120_C$ should be migrated to a different host 104 (e.g., host $104_2$).

However, it may not be possible to migrate away VMs already deployed on the target host. For example, it may be the case that the VMs deployed on the target host cannot execute (due to affinity constraints) on any other host. In addition, it may be the case that there are no other hosts with sufficient free resource capacity to host the migrated $VM_s$. Thus, hybrid cloud manager 132 may determine whether the target location has sufficient resources to host a partial cluster (i.e., a subset of the VMs in the cluster).

An example of a partial cluster is described in connection with FIGS. 2A and 2B. In these figures, VMs $120_A$, $120_B$, and $120_C$ are referred to as "internal communicators" because these VMs do not interface with external clients. On the other hand, VMs $172_A$ and $172_B$ (which are deployed in cloud computing environment 170) are referred to as "external communicators" because these VMs do interface with external clients. As previously mentioned, it is sometimes advantageous to consolidate internal communicators on a common host, while allowing external communicators that are a part of the same multi-tier application to remain on another host (or in the cloud) because it may be more advantageous for the external communicators to be situated closer to external clients than to internal communicators. This is true despite the fact that such external communicators frequently transmit and received data to and from internal communicators. Thus, an example of a partial cluster (as shown in FIGS. 2A and 2B) comprises VMs $120_A$, $120_B$, and $120_C$. In this case, hybrid cloud manager 132 determines whether the target location (e.g., host $104_1$ in FIGS. 2A and 2B) has sufficient resources to host the partial cluster. If so, then, hybrid cloud manager 132 migrates the partial cluster to the target location.

In some embodiments, hybrid cloud manager 132 relies on other factors in addition to the level of communication between VMs in determining whether to migrate one or more VMs to a target environment. For example, in the embodiment of FIG. 2A, hybrid cloud manager 132 instructs hybridity director 174 to determine the level of communication between VMs $172_A$ and $172_B$ and external clients that use those VMs. Hybridity director 174 then transmits the results of this monitoring to hybrid cloud manager 132. If hybrid cloud manager 132 determines that the level of communication between VMs $172_A$ and $172_B$ and one or more external clients (which are, typically, end users that communicate with application 200 through a web browser) is high, then hybrid cloud manager 132 may determine that, in such a case, it is not advantageous to initiate migration of VMs $172_A$ and $172_B$. This is due to the fact that external clients communicating with VMs $172_A$ and $172_B$ are physically situated closer to cloud computing environment 170 than to virtualized computing system 102. As an example, external clients may be physically concentrated in Germany, cloud computing environment 170 is physically situated in London, and virtualized computing system 102 is physically situated in California. In this case, the added network delay that would be incurred by external clients in communicating with VMs $172_A$ and $172_B$ may outweigh the benefit of reduced communication delay between VMs $172_A$ and $172_B$ and VMs deployed in virtualized computing system 102. Thus, hybrid cloud manager 132 may consolidate a subset of the VMs in application 200, such as VMs $120_A$, $120_B$, and $120_D$. These VMs may be considered as "internal communicators," because these VMs do not interact with external clients.

However, if external clients are concentrated closer to virtualized computing system 102, then migration of VMs $172_A$ and $172_B$ may be determined to be beneficial. In each case, hybrid cloud manager 132 determines whether to migrate VMs based on a variety of factors including, but not limited to, available system resources (i.e., CPU and RAM), network capacity and availability, and physical proximity between external clients and one or more access points of the application (such as a web server).

For instance, using the example depicted in FIG. 2A, hybrid cloud manager 132 determines, through monitoring gateway 124, that VMs $120_A$, $120_B$, and $120_D$ are in heavy communication with one another. In addition, through monitoring gateway 124, hybrid cloud manager 132 determines that VMs $172_A$ and $172_B$ are in heavy communication with VMs $120_A$ and $120_B$. Therefore, hybrid cloud manager 132 determines that it may be advantageous to deploy the aforementioned VMs on a single host 104. However, hybrid cloud manager 132 instructs hybridity director 174 to determine whether a high level of communication exists between VMs $172_A$ and $172_B$ and one or more external clients. Further, hybridity director 174 determines if the external clients are physically concentrated at a particular location and whether that location is closer to the infrastructure underlying cloud computing environment 170 or a potential target host 104 in virtualized computing system 102. In the example of FIG. 2A, hybridity director 174 determines (and informs hybrid cloud manager 132) that the majority of external clients of application 200 (i.e., of VMs $172_A$ and $172_B$) are concentrated closer to virtualized computing system 102 than to cloud computing environment 170. As previously mentioned, this weighs in favor of migrating VMs from cloud computing environment 170 to a host included in virtualized computing system 102.

FIG. 2B depicts the VMs deployed in hybrid cloud computing system 100 after hybrid cloud manager 132 performs the migrations described above. Thus, as shown in FIG. 2B, $120_D$, $172_A$, and $172_B$ have been migrated to host $104_1$. Thus, these VMs, along with VMs $120_A$ and $120_B$ are all deployed on host $104_1$. It should be noted that, in order to free system resources on host $104_1$ to accommodate the migrated VMs, hybrid cloud manager 132 migrates VM $120_C$ to host $104_2$. Thus, host $104_2$ is depicted in FIG. 2B as hosting both VMs $120_C$ and $120_E$. Finally, cloud computing environment 170 no longer hosts VMs $172_A$ and $172_B$. However, VMs $172_C$ and $172_D$ are still deployed in cloud computing environment 170. Thus, external clients of VMs $172_A$ and $172_B$ access those VMs in virtualized computing system 102, while external clients of VMs $172_C$ and $172_D$ continue to access those VMs in cloud computing environment 170. It should be noted that the example depicted in FIGS. 2A and 2B is for illustrative purposes and that, depending on system resource utilization, external client concentration, and other such factors, other migration patterns are possible and are within the scope of the present invention.

Accordingly, embodiments of the present disclosure provide methods of defragmentation of VMs in a cloud environment determined by where the source and destination for the defragmentation exist. As described above, when the source and the destination are across cloud or provisioning ownership boundaries, defragmentation is performed in a way to ensure that accounts for the cost of the WAN link in between the two clouds. Alternatively, when the defragmentation occurs within a public or private cloud instance, defragmentation may be performed to co-locate a tenant's VMs within a same "pod" of a single site (a pod may refer to an organizational unit of hardware resources, such as from hardware platform 160). For example, when VMs are co-located to a same pod, application traffic between the VMs will not route through a network interconnecting multiple pods (i.e., the "pod core"). Hybridity director 174 is configured to account for pod core switch bandwidth and direct connect costs across the datacenters when performing defragmentation. In addition to cost (bandwidth usage, etc.) another trigger to "de-fragment" a tenant's VMs may be resource planning. As a cloud provider, the VMs may be consolidated on an infrastructure that economizes current capacity and optimizes for future growth. Such variables may be driven through the billing and metering systems in the cloud datacenter.

Although one or more embodiments have been described herein in some detail for clarity of understanding, it should be recognized that certain changes and modifications may be made without departing from the spirit of the disclosure. The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, yielding, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for managing a hybrid cloud computing system, the method comprising:
   determining communication affinity between virtual machines in a cluster of virtual machines, the cluster of virtual machines including a first virtual machine and a second virtual machine, wherein the first virtual machine is executing in a virtualized computing system, and the second virtual machine is executing in a cloud computing environment connected to the virtualized computing system through a virtual private network (VPN), wherein the virtualized computing system is managed by a tenant that accesses the cloud computing environment, wherein the determining communication affinity includes:
   calculating a ratio of a number of data packets that the first virtual machine transmits to and receives from the second virtual machine to a total number of data packets that the first virtual machine transmits and receives during a predetermined time interval, including obtaining a measure of frequency and exclusivity of communication between the first virtual machine and the second virtual machine by examining headers of data packets for the first virtual machine during the predetermined time interval; and
   determining a high level of communication affinity between the first virtual machine and the second virtual machine if the ratio exceeds a predetermined value;
   determining a target location in the hybrid cloud computing system to host the cluster of virtual machines based on the communication affinity; and
   migrating at least one of the virtual machines in the cluster of virtual machines to the target location, such that the first and second virtual machines are both at the target location.

2. The method of claim 1, wherein migrating at least one of the virtual machines in the cluster of virtual machines to the target location further comprises:
   migrating the first virtual machine from the virtualized computing system to the cloud computing environment.

3. The method of claim 1, wherein migrating at least one of the virtual machines in the cluster of virtual machines to the target location further comprises:
   migrating the second virtual machine from the cloud computing environment to a host in the virtualized computing system.

4. The method of claim 1, wherein the target location in the hybrid cloud computing system is determined based on resource allocation at the virtualized computing system and the cloud computing environment.

5. The method of claim 1, further comprising:
   responsive to determining the target location does not have sufficient available resources to host the cluster, and prior to migrating the at least one of the virtual machines in the cluster of virtual machines to the target location, migrating one or more virtual machines previously deployed on a host at the target location to one or more other hosts included in the hybrid cloud computing system.

6. The method of claim 1, further comprising, wherein, responsive to determining that the target location does not have sufficient available resources to host the cluster and determining not to migrate one or more virtual machines previously deployed on a host at the target location:
   partitioning the cluster into a first part containing a first set of virtual machines and a second part containing a second set of different virtual machines; and
   migrating only the first set of virtual machines to the target location.

7. A non-transitory computer-readable medium comprising instructions executable by one or more computer hosts in a hybrid cloud computing system, where the instructions, when executed, cause the one or more computer hosts to carry out a method for managing a hybrid cloud computing system, the method comprising:

determining communication affinity between virtual machines in a cluster of virtual machines, the cluster of virtual machines including a first virtual machine and a second virtual machine, wherein the first virtual machine is executing in a virtualized computing system, and the second virtual machine is executing in a cloud computing environment connected to the virtualized computing system through a virtual private network (VPN), wherein the virtualized computing system is managed by a tenant that accesses the cloud computing environment, wherein the determining communication affinity includes:

calculating a ratio of a number of data packets that the first virtual machine transmits to and receives from the second virtual machine to a total number of data packets that the first virtual machine transmits and receives during a predetermined time interval, including obtaining a measure of frequency and exclusivity of communication between the first virtual machine and the second virtual machine by examining headers of data packets for the first virtual machine during the predetermined time interval; and determining a high level of communication affinity between the first virtual machine and the second virtual machine if the ratio exceeds a predetermined value;

determining a target location in the hybrid cloud computing system to host the cluster of virtual machines based on the communication affinity; and migrating at least one of the virtual machines in the cluster of virtual machines to the target location, such that the first and second virtual machines are both at the target location.

8. The non-transitory computer-readable medium of claim 7, wherein migrating at least one of the virtual machines in the cluster of virtual machines to the target location further comprises:

migrating the first virtual machine from the virtualized computing system to the cloud computing environment.

9. The non-transitory computer-readable medium of claim 7, wherein migrating at least one of the virtual machines in the cluster of virtual machines to the target location further comprises:

migrating the second virtual machine from the cloud computing environment to a host in the virtualized computing system.

10. The non-transitory computer-readable medium of claim 7, wherein the target location in the hybrid cloud computing system is determined based on resource allocation at the virtualized computing system and the cloud computing environment.

11. The non-transitory computer-readable medium of claim 7, wherein the method further comprises:

responsive to determining the target location does not have sufficient available resources to host the cluster, and prior to migrating the at least one of the virtual machines in the cluster of virtual machines to the target location, migrating one or more virtual machines previously deployed on a host at the target location to one or more other hosts included in the hybrid cloud computing system.

12. The non-transitory computer-readable medium of claim 7, wherein the method comprising, responsive to determining that the target location does not have sufficient available resources to host the cluster and determining not to migrate one or more virtual machines previously deployed on a host at the target location:

partitioning the cluster into a first part containing a first set of virtual machines and a second part containing a second set of different virtual machines; and migrating only the first set of virtual machines to the target location.

13. A hybrid cloud computing system, comprising:

a virtualized computing system comprising a plurality of hosts;

a cloud computing environment that executes on a cloud-based infrastructure platform, wherein the virtualized computing system is managed by a tenant that accesses the cloud computing environment; and a hybrid cloud management server comprising a processor programmed to carry out a method comprising:

determining communication affinity between virtual machines in a cluster of virtual machines, the cluster of virtual machines including a first virtual machine and a second virtual machine, wherein the first virtual machine is executing in a virtualized computing system connected to the virtualized computing system through a virtual private network (VPN), and the second virtual machine is executing in the cloud computing environment, wherein the determining communication affinity includes:

calculating a ratio of a number of data packets that the first virtual machine transmits to and receives from the second virtual machine to a total number of data packets that the first virtual machine transmits and receives during a predetermined time interval, including obtaining a measure of frequency and exclusivity of communication between the first virtual machine and the second virtual machine by examining headers of data packets for the first virtual machine during the predetermined time interval; and determining a high level of communication affinity between the first virtual machine and the second virtual machine if the ratio exceeds a predetermined value;

determining a target location in the hybrid cloud computing system to host the cluster of virtual machines based on the communication affinity; and migrating at least one of the virtual machines in the cluster of virtual machines to the target location, such that the first and second virtual machines are both at the target location.

14. The hybrid cloud computing system of claim 13, wherein the target location is selected from at least one of a host in the virtualized computing system and the cloud computing environment.

15. The hybrid cloud computing system of claim 13, wherein the target location in the hybrid cloud computing system is determined based on resource allocation at the virtualized computing system and the cloud computing environment.

16. The hybrid cloud computing system of claim 13, wherein the method further comprises:

responsive to determining the target location does not have sufficient available resources to host the cluster, and prior to migrating the at least one of the virtual machines in the cluster of virtual machines to the target location, migrating one or more virtual machines previously deployed on a host at the target location to one or more other hosts included in the hybrid cloud computing system.

17. The hybrid cloud computing system of claim 13, wherein the method further comprises:

responsive to determining that the target location does not have sufficient available resources to host the cluster and determining not to migrate one or more virtual machines previously deployed on a host at the target location, partitioning the cluster into a first part containing a first set of virtual machines and a second part containing a second set of different virtual machines, and migrating only the first set of virtual machines to the target location.

* * * * *